United States Patent [19]

Krebser et al.

[11] Patent Number: 4,759,703
[45] Date of Patent: Jul. 26, 1988

[54] EQUIPMENT FOR SPRAYING THE MOLD SURFACES OF MULTI-PART DIES

[75] Inventors: Rudolf Krebser, Schübelbach; Hans Leuzinger, Mollis, both of Switzerland

[73] Assignee: Netstal-Maschinen AG, Switzerland

[21] Appl. No.: 925,737

[22] Filed: Oct. 30, 1986

[30] Foreign Application Priority Data

Mar. 5, 1986 [CH] Switzerland .............. 906/86

[51] Int. Cl.⁴ ............... B29C 45/24; B29C 45/76; B29C 39/44
[52] U.S. Cl. ........................... 425/90; 72/44; 239/752; 425/155; 425/228
[58] Field of Search .............. 425/103, 225, 226, 227, 425/228, 90, 155, 98; 264/39; 164/267, 159; 72/43, 44; 239/173, 743, 744, 750, 751, 752

[56] References Cited

U.S. PATENT DOCUMENTS

| | | | |
|---|---|---|---|
| 2,518,594 | 8/1950 | Blanchard et al. | 425/225 |
| 3,248,762 | 5/1966 | Wagner | 164/267 |
| 3,544,355 | 12/1970 | Ott | 164/267 |
| 3,633,651 | 1/1972 | Ruhlandt | 425/103 |
| 3,825,057 | 7/1974 | Baumann et al. | 164/267 |
| 3,941,537 | 3/1976 | Abraham | 164/158 |
| 4,138,454 | 2/1979 | Harmon et al. | 264/39 |
| 4,592,407 | 6/1986 | Yamaguchi et al. | 164/267 |
| 4,605,170 | 8/1986 | Thurner | 425/103 |

*Primary Examiner*—Willard E. Hoag
*Attorney, Agent, or Firm*—McGlew and Tuttle

[57] ABSTRACT

The spraying equipment is arranged at a station provided with means for opening and closing the die, e.g. at a preheating station of a plastic injection molding installation. The equipment comprises a spray arm with nozzles, movable, e.g. hydraulically in horizontal and vertical directions, which arm is connected to a spray medium supply. This supply as well as the drive of the spray arm, is automatically controlled via the computer of the injection molding installation in such a way that with the die open, the spray arm is automatically moved into operating position between the die parts and is manufactured in accordance with the tool data picked up by the computer. After completion of the spraying the arm is retracted into an inoperative position outside the die. Operating personnel is superfluous.

6 Claims, 1 Drawing Sheet

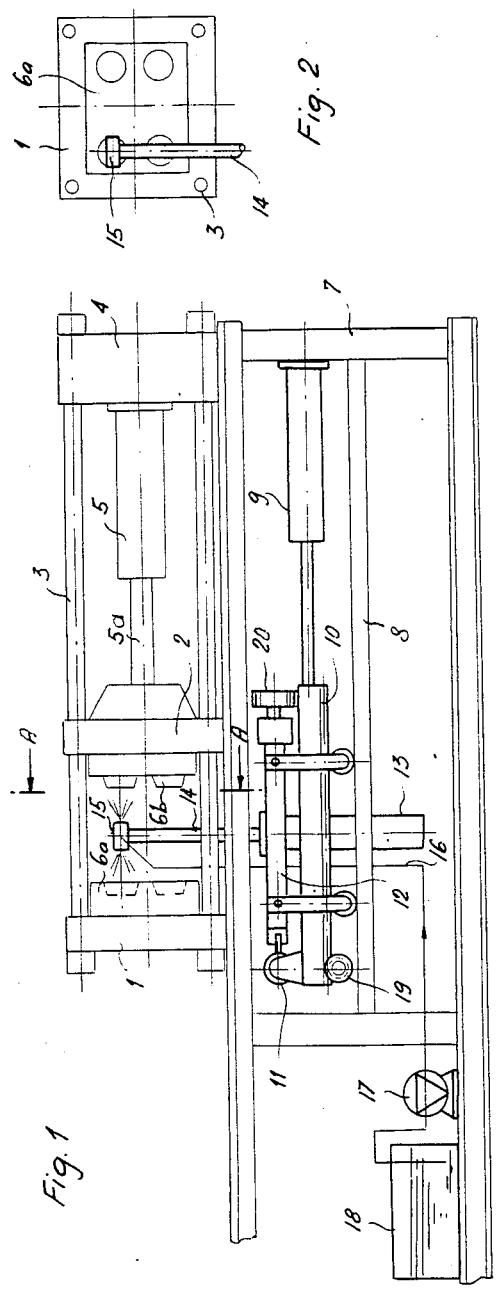

EQUIPMENT FOR SPRAYING THE MOLD SURFACES OF MULTI-PART DIES

FIELD AND BACKGROUND OF THE INVENTION

This invention relates in general to plastic injection molding devices and in particular to a new and useful device having means for spraying the mold surfaces of multi-part injection and pressing dies.

The invention provides equipment for spraying the mold surfaces of multi-part injection molding and pressing dies of machines for the production of shaped parts from plasticizable material, in particular dies of a plastic injection molding machine.

In the production of injection molded or pressed pats, e.g. of plastic, plastic-like or ceramic material, by means of multi-part dies, it is usually necessary periodically to spray the mold surfaces forming the mold cavities with a mold release agent, to facilitate the removal of the molding from the die. For this purpose it is known practice to fix spray nozzles on the die or on the machine in such a way that spray medium supplied to them can get onto the mold surfaces when the die is open. But as such machines can operates with a great variety of exchangeable dies, either each die must have its own nozzles to be coupled with a spray medium supply, or the nozzles must be attached on the machine in such a way that they can fulfill their function also for also for greatly varying dies, this being possible usually only approximately. If the dies are changed, they must usually be cleaned before being stored and must be sprayed with an anti-corrosion agent, this being normally done on the machine by means of a hand held spray gun. Not only is this complicated, but it also means the employment of an operator, disadvantage when an automated machine equipped with an automatically controlled handling device for the tool or die change is involved, which could otherwise operate entirely without an operator.

SUMMARY OF THE INVENTION

The present invention avoids the disadvantages of the known spraying equipment. For this purpose the equipment according to the invention is characterized in that, at a treatment station provided with means for the automatic opening and closing of the multi-part die, a movable spray arm connected to a spray medium supply and provided with a nozzle head is arranged, whose drive is connected with a programmable control, to move the spray head automatically into its operating position, adapted to the particular die and turned toward the mold surfaces to be sprayed, and to retract it to the inoperative position.

Actually the spray equipment may be arranged directly on the production machine and may be designed so that via separate nozzles the spray head can spray the mold surfaces with different treatment media, and that, accordingly, e.g. after each operating cycle of the machine or after several such cycles, the spray head can, either periodically or before each die change, be moved in and out of the operating position. But it is possible also to arrange the equipment at an intermediate station provided with means for opening and closing the die and located between the machine and the die storage area, e.g. a preheating station, and to use it for the spraying of the mold surfaces for cleaning and/or preserving. Expediently the spray arm, connected with the spray medium supply, e.g. via flexible tubes, is mounted on a horizontally and vertically movable support, which makes it possible to introduce the spray head between the parts of the open die and, especially when a multi-mold die is involved, to move it inside the space between the mold parts. The control of the spray arm drive and of the spray medium supply is expediently connected to the central computer of the production machine, which calculates the distance to be traveled by the spray arm in accordance with the particular die employed or to be employed. Also the spray head itself could be arranged movable on the spray arm.

Accordingly it is an object of the invention to provide an improved device for association with a multi-part injection molding and pressing die which includes a fixed mold part containing a fixed die and a movable mold part which is movable backwardly and forwardly in respect thereto and including a spraying device including a conduit which is mounted alongside the fixed and movable dies and is movable at an angle to the movement of the movable die between the two die parts and may be manipulated while it is connected to a supply of liquid medium for spraying the mold parts.

A further object of the invention is to provide a device for spraying mold parts which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a side elevational view of a preheating station of an injection molding machine installation with spraying equipment constructed in accordance with the invention; and FIG. 2 is an elevation on a larger scale of the mold surface of a part of a two-part quadruple mold die with spray arm in middle position.

DESCRIPTION OF THE PREFERRED EMBODIMENTS

Referring to the drawings in particular the invention embodied therein comprises a spraying device 14 which is mounted adjacent a fixed and movable die combination so that it may be positioned between the two die parts and operated to spray the parts as it is connected to a source of spray medium.

The drawings illustrate schematically the preheating station of an automatic, i.e. unmanned, production installation, which comprises in addition (not shown) a die depot, a die-changing and transport system, an injection molding machine, and a computer for the control of all operations of the installation. In analogy to the injection molding machine, the preheating station possesses a fixed mold carrying plate 1 and a movable mold carrying plate 2 guided on spars 3. The spars 3 are supported, at one end, on the mold carrying plate 1; and at the other end, on a fixed support plate 4. Secured on this support plate 4 is further the cylinder of a hydraulic device or piston-cylinder combination, the piston rod 52 of which is connected to the movable mold-carrying plate 2. The two plates 1 and 2 are intended for the temporary seating of the two halves of a two-part mold or die 6a, 6b; the couplings for the releasable attachment of the die halves on the plates and for connecting the preheating means, such as a fluid media, are not shown.

The frame 7 of the preheating equipment, carrying the described seating mechanism 1 to 5 for the mold parts or dies 6a and 6b, is provided with a rail means 8 parallel to the spars 3, on which a carriage 10 which is drivable by means of a hydraulic piston/cylinder device 9, is displaceable lengthwise. On the carriage 10, a support 12 displaceable by means of a piston/cylinder or hydraulic device 11 crosswise to the carriage conduction is arranged, on which is fastened a vertically working hydraulic piston/cylinder device 13. The piston rod 14, emerging from the cylinder of the hydraulic device 13 upwardly, is formed as a spray arm with a spray can head 15 at its free end, which is provided on both sides with one or more nozzles with axes parallel to the carriage means. Either the hollow spray arm 14 or the spray can head 15 communicates via an appropriately flexible line via a delivery pump 17 with a spray medium reservoir 18. Arranged at the carriage 10 is a path measuring device 19 associated with the hydraulic device 3; and arranged at the support 12 are coders 20 for the path measurement of the support 12 or of the spray arm 14. Instead of the hydraulic devices 9, 11 and 13, of course, pneumatic or electric drive devices might be provided, e.g. acting via threaded spindles.

All drive devices and measuring devices or coders are connected with the computer of the installation, which in accordance with the respective operation in the installation and in adaptation to the respective die calculates the position and movement path of the spray system and brings about the respective control signals.

During retooling, the die 6a, 6b is removed by means of the transport system of the injection molding machine and installed in the preheating station, i.e. coupled with the two mold carrying plates 1, 2 in a closing position. At that time, of course, the spray arm 14 of the spraying equipment is in its lower end position completely outside the region of the two carrying plates.

After the die 6a, 6b has been opened by means of the hydraulic device 9, the spray arm 14 is moved upwardly centrally between the die halves 6a, 6b by means of the hydraulic device 13. Depending on the number, position and size of the cavities and/or elevations of the mold surfaces of the two die parts 6a and 6b, the nozzles of the spray nozzle head 15 can now be moved exactly into the position necessary for satisfactory spraying of these surfaces, by appropriate moving of the spray arm.

The spraying device thus functions fully automatically. Since in the described example it is arranged outside the injection molding machine, there is no danger of contamination, of machine parts sensitive in this respect, with aerosol and dust adhering thereto. It is also readily possible to equip the spray arm with separate feed lines and nozzles for the spraying of different media as needed. The equipment can be integrated in any installation with dies for the production of injection molded or pressed parts of plasticizable substantes. Compared with the known manual spraying, it not only has the advantage of saving personnel, but also leads to reduced consumption of spray medium owing to the aimed spraying of the mold surfaces. Arranging the spraying equipment at the preheating station of a production installation working with injection molding dies may be advantageous not only because they necessarily pass this station during retooling, but also because it is possible to assign several production machines to a single such preheating station. In this connection the preheating station may also be equipped with several die-receiving places, to which may be assigned, e.g. a separate spray equipment for each or a single common spray equipment.

While specific embodiments of the invention have been shown and described in detail to illustrate the application of the principles of the invention, it will be understood that the invention may be embodied otherwise without departing from such principles.

What is claimed is:

1. In a molding apparatus having means for spraying mold surfaces of a multi-part mold for an injection molding machine and for spraying the mold surfaces of a molding press having multi-part dies for the production of shaped parts of plasticizable material, the improvement comprising:

a carriage mounted for movement alongside said multi-part die, a conduit carried on said carriage and being movable therewith and having one end terminating in a nozzle for spraying and having a connection to a source of spray medium, and means for moving said carriage relative to the die for cleaning the die, said apparatus including a guide, a fixed mold carried at one end of said guide and a movable mold part being slidable on said guide toward and away from said fixed mold part, means for driving said movable mold, a support for the guide having a trackway, a carriage movable along said trackway alongside said movable mold part, a cylinder carried on said carriage having a nozzle drive cylinder, a movable spray conduit piston rod movable in said cylinder and having a nozzle head which may be extended with said piston rod to spray the mold parts when the movable mold part is separated from said fixed mold part, and means connected to said nozzle drive cylinder for controlling the movement of said spray head.

2. An apparatus according to claim 1, including a programmable control connected to said carriage for moving said carriage, said conduit being mounted on said carriage for movement toward and away from the dies including a flexible tube connected to said conduit for supplying the pressurized media thereto and including a programmable control connected to said conduit for shifting said conduit, said conduit having a spray head which is movable by said control automatically in operative position and is turnable towards the mold surfaces to be sprayed and for retracting said conduit with said spray head to an inoperative position for the operation of said multi-part injection molding and pressing dies.

3. An apparatus according to claim 1, wherein said carriage is moved by a piston and cylinder drive.

4. An apparatus according to claim 1, wherein said movable mold part moves horizontally, said conduit being movable vertically into and out of the space between said fixed mold and said movable mold.

5. An apparatus according to claim 3, including a path measuring device carried by said carriage which is operable to measure the movement of said carriage.

6. In a molding apparatus having means for spraying the mold surface of a multi-part injection molder having multi-part dies and a molding press having multi-part dies for shaped parts of plasticizable material, the improvement comprising a guide rail alongside and substantially parallel to the guide spar, a carriage movable along said guide rail, a support movable on said carriage in a direction angled to said guide rail the movement of said support and the movement of said carriage defining a plane of movement of said support and carriage, a conduit carried on said support being movable therewith and having one end terminating in a spray nozzle for spraying said mold parts and having a connection to a source of spray medium said conduit being movable perpendicular to said plane of movement of said support and said carriage, and a nozzle drive for extending and retracting said nozzle conduit in a direction transverse to said rail and said guide spar to move said nozzle conduit outwardly of said carriage for interposing said nozzle between said mold parts for spraying the mold parts and for retracting said nozzle towards said carriage.

* * * * *